(12) United States Patent
Blasinski et al.

(10) Patent No.: US 9,111,186 B2
(45) Date of Patent: Aug. 18, 2015

(54) COLOR BARCODES FOR MOBILE APPLICATIONS: A PER CHANNEL FRAMEWORK

(71) Applicant: University of Rochester, Rochester, NY (US)

(72) Inventors: Henryk Blasinski, Stanford, CA (US); Orhan Bulan, Rochester, NY (US); Gaurav Sharma, Webster, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 13/648,685

(22) Filed: Oct. 10, 2012

(65) Prior Publication Data
US 2013/0092738 A1    Apr. 18, 2013

Related U.S. Application Data

(60) Provisional application No. 61/546,209, filed on Oct. 12, 2011.

(51) Int. Cl.
*G06K 7/00* (2006.01)
*G06K 19/06* (2006.01)
(Continued)

(52) U.S. Cl.
CPC ........ *G06K 19/0614* (2013.01); *G06K 7/10821* (2013.01); *G06K 7/12* (2013.01); *G06K 19/06037* (2013.01); *G06K 2019/06225* (2013.01)

(58) Field of Classification Search
CPC .............. G06K 19/06037; G06K 2019/06225; G06K 7/1417; G06K 7/14; G06K 1/121; G06T 1/0042; H04N 1/32208; H04N 1/32309
USPC .............................. 235/435, 439, 454, 462.01
See application file for complete search history.

(56) References Cited

U.S. PATENT DOCUMENTS

| 5,369,261 A | 11/1994 | Shamir |
| 5,591,956 A | 1/1997 | Longacre, Jr. et al. |

(Continued)

FOREIGN PATENT DOCUMENTS

| WO | WO-2008075898 A1 | 6/2008 |
| WO | WO-2010031110 A1 | 3/2010 |

OTHER PUBLICATIONS

Bagherinia, H., "A Theory of Color Barcodes," 2011 Computer Vision Workshops (ICCV Workshops), IEEE International Conference (pp. 806-813).

(Continued)

*Primary Examiner* — Steven S Paik
*Assistant Examiner* — Claude J Brown
(74) *Attorney, Agent, or Firm* — Harris Beach PLLC

(57) ABSTRACT

A new framework for extending monochrome barcodes to color which offers higher data rates is described. In one embodiment of the present invention, the framework encodes independent data in each of the cyan, magenta, and yellow print colorant channels commonly used in color printing and decodes the data from each of the complementary red, green, and blue channels in capture color channels. The framework effectively increases the capacity of monochrome barcodes by a factor of three. In another embodiment of the present invention, a physical model based approach mitigates the effect of cross-channel interference among the print-colorant channels and capture color channels. In another embodiment of the invention, a pilot block methodology is used to estimate the model parameters and enable cross-channel interference cancellation. In another embodiment of the invention, an expectation maximization (EM)-type methodology estimates the model parameters and enables cross-channel interference cancellation.

9 Claims, 12 Drawing Sheets

(51) Int. Cl.
G06K 7/10 (2006.01)
G06K 7/12 (2006.01)

(56) References Cited

U.S. PATENT DOCUMENTS

| | | | |
|---|---|---|---|
| 5,612,524 | A | 3/1997 | Sant'Anselmo et al. |
| 5,726,435 | A | 3/1998 | Hara et al. |
| 5,818,032 | A | 10/1998 | Sun et al. |
| 6,070,805 | A * | 6/2000 | Kaufman et al. ............. 235/494 |
| 6,981,644 | B2 | 1/2006 | Cheong et al. |
| 7,020,327 | B2 | 3/2006 | Tack-don et al. |
| 7,124,957 | B2 * | 10/2006 | Hosoi et al. ................... 235/492 |
| 7,185,816 | B1 * | 3/2007 | Shoobridge ............. 235/462.04 |
| 7,382,917 | B2 | 6/2008 | Barone et al. |
| 7,478,746 | B2 * | 1/2009 | Cattrone ......................... 235/10 |
| 7,487,914 | B2 | 2/2009 | Yoon et al. |
| 7,490,134 | B2 | 2/2009 | Ono et al. |
| 7,497,380 | B2 | 3/2009 | Chang et al. |
| 8,047,447 | B2 | 11/2011 | Bulan et al. |
| 8,079,525 | B1 * | 12/2011 | Zolotov ........................ 235/469 |
| 8,100,330 | B2 | 1/2012 | Bulan et al. |
| 2002/0021824 | A1 * | 2/2002 | Reed et al. .................... 382/100 |
| 2002/0085249 | A1 * | 7/2002 | Tsuda et al. .................. 358/515 |
| 2003/0117262 | A1 * | 6/2003 | Anderegg et al. ............ 340/5.53 |
| 2005/0011955 | A1 * | 1/2005 | Saito ........................ 235/462.04 |
| 2005/0274804 | A1 * | 12/2005 | Matsumoto ............. 235/462.01 |
| 2008/0000991 | A1 | 1/2008 | Yin et al. |
| 2008/0048044 | A1 * | 2/2008 | Zhao et al. .................... 235/494 |
| 2008/0191035 | A1 * | 8/2008 | Cheon ........................... 235/494 |
| 2009/0212112 | A1 | 8/2009 | Li et al. |
| 2009/0307232 | A1 | 12/2009 | Hall |
| 2010/0020970 | A1 | 1/2010 | Liu et al. |
| 2010/0243747 | A1 * | 9/2010 | Saito ............................. 235/494 |
| 2010/0272193 | A1 | 10/2010 | Khan et al. |
| 2010/0282851 | A1 | 11/2010 | Bulan et al. |
| 2010/0282856 | A1 * | 11/2010 | Bulan et al. ................... 235/494 |
| 2011/0127331 | A1 | 6/2011 | Zhao et al. |
| 2011/0233284 | A1 * | 9/2011 | Howard ........................ 235/494 |

OTHER PUBLICATIONS

Bulan, Orhan et al., "High Capacity Color Barcodes Using Dot Orientation and Color Separability," 2009 SPIE-IS&T, vol. 7254 (pp. 725417-1-725417-7).

Bulan Orhan, "High Capacity Color Barcodes: Per Channel Data Encoding via Orientation Modulation in Elliptical Dot Arrays," May 2011 IEEE Transactions on Image Processing, vol. 20, No. 5 (pp. 1337-1350).

Bulan, Orhan et al., "Color QR Codes: Increased Capacity Via Per-Channel Data Encoding and Interference Cancellation," 2011 19th Color and Imaging Conference Final Program and Proceedings (pp. 156-159).

Bulan, Orhan et al., "High Capacity Image Barcodes Using Color Separability," 2011 SPIE-IS&T, vol. 7866 (pp. 78660N-1-78660N-9).

Chang, Xiao-Wen et al., "Solving Box-Constrained Integer Least Squares Problems," Jan. 2008 IEEE Transactions on Wireless Communications, vol. 7, No. 1 (pp. 277-287).

Claycomb, William et al., "Using a Two Dimensional Colorized Barcode Solution for Authentication in Pervasive Computing," Jun. 26-29, 2006 Pervasive Services IEEE International Conference (pp. 173-180).

The 2D Barcode Matrix, Dec./Jan. 2005-2006, IEE Computing & Control Engineering (p. 39).

Ebling, Maria et al., "Bar Codes Everywhere You Look," Apr.-Jun. 2010, Pervasive Computing (pp. 4-5).

Grillo, Antonio et al., "High Capacity Colored Two Dimensional Codes," 2010 in Proceedings of the International Multiconference on Computer Science and Information Technology (pp. 709-716).

Kato, Hiroko et al., "Pervasive 2D Barcodes for Camera Phone Applications," 2007 Pervasive Computing, IEEE Computer Society (pp. 76-85).

Kato, Hiroko et al., "Development of a Novel Finder Pattern for Effective Color 2D Barcode Detection," 2008 Proceedings of IEEE International Symposium on Parallel and Distributed Processing With Applications (pp. 1006-1013).

Kato, Hiroko et al., "Novel Colour Selection Scheme for 2D Barcode," Dec. 7-9, 2009 in International Symposium on Intelligent Signal Processing and Communication Systems (ISPACS) (pp. 529-532).

Langlotz, Tobias et al., "Unsynchronized 4D Barcodes (Coding and Decoding time-Multiplexed 2D Colorcodes)," 2007 ISVC, Part I, LNCS 4841 (pp. 363-374).

Liu, Yue et al., "Automatic Recognition Algorithm of Quick Response Code Based on Embedded System," 2006 in Proceedings of the Sixth International Conference on Intelligent Systems Design and Applications (ISDA'06) (6 pages).

Lyons, Sarah et al., "Two-Dimensional Barcodes for Mobile Phones," 2010 in 25th Biennial Symposium on Communications, Kingston, Ontario Canada (pp. 344-347).

Madhavapeddy, Anil et al., "Using Camera-Phones to Enhance Human-Computer Interaction," Sep. 2004 in Proceedings of Ubiquitous Computing (Adjunct Proceedings: Demos), Nottingham, United Kingdom, vol. 182 (2 pages).

Nurwono, Kris Antoni Hadiputra et al., "Color Quick Response Code for Mobile Content Distribution," 2009 in Proceedings of the 7th International Conference on Advances in Mobile Computing and Multimedia (MoMM) (pp. 267-271).

Ohbuchi, Eisaku et al., "Barcode Readers using the Camera Device in Mobile Phones," 2004 in Proceedings of the 2004 International Conference on Cyberworlds (CW'04) (6 pages).

Ong, Siong Khai et al., "The Use of Border in Colour 2D Barcode," 2008 in International Symposium on Parallel and Distributed Processing with Applications (ISPA) (pp. 999-1005).

Ong, Siong Khai, et al., "Innovative Border for Colour 2D Barcode," Oct. 2009 in Tenth Postgraduate Electrical Engineering & Computing Symposium (PEECS'2009), Edith Cowan University, Perth, Australia (6 pages).

Ong, Siong Khai et al., "Performance of Mobile Camera on Colour 2D Barcode," Dec. 2009 IEEE International Symposium on Intelligent Signal Processing and Communication Systems (ISPACS'2009), Kanazawa, Japan (pp. 497-500).

Oztan, Basak et al., "Per-separation clustered-dot color halftone watermarks: separation estimation based on spatial frequency content," Oct.-Dec. 2010, Journal of Electronic Imaging, vol. 19, No. 4, (pp. 043007-1-043007-22).

Parikh, Devi et al., "Localization and Segmentation of a 2D High Capacity Color Barcode," Jan. 2008 in IEEE Workshop on Applications of Computer Vision (WACV), Copper Mountain, Colorado (pp. 1-6).

Liu, Yue et al., "Recognition of QR Code with Mobile Phones," 2008 Chinese Control and Decision Conference (CCDC 2008) (pp. 203-206).

Schubert, Erhard et al., "A vision based reading system for color coded barcodes," 1996 Proc. SPIE: Machine Vision Applications in Industrial Inspection IV, vol. 2665, No. 1 (pp. 59-68).

Sharma, Gaurav et al., "Digital Color Imaging," Jul. 1997 IEEE Transactions on Image Processing, vol. 6, No. 7, (pp. 901-932).

Simske, Steven J. et al., "Qualification of a Layered Security Print Deterrent," 2007 Journal of Imaging Science and Technology, vol. 51, No. 1 (pp. 86-95).

Simske, Steven J., et al., "Revenge of the Physical-Mobile Color Barcode Solutions to Security Challenges," Jan. 20-22, 2010, published and presented at Optical Document Security, San Francisco, California (15 pages).

Simske, Steven J. et al., "Error-Correcting Code (ECC) and Module Size Considerations in 2D Aztec Barcode Readability," 2010 Journal of Imaging Science and Technology, vol. 54, No. 6 (pp. 060405-1-060405-6).

Simske, Steven J. et al., "Staggered and Dual-Channel Barcodes," 2011 HP Laboratories, Technical Reports HPL-2011-199 (5 pages).

Tan, Keng T. et al., "Designing a Color Barcode for Mobile Applications," Apr.-Jun. 2012 IEEE Pervasive Computing (pp. 50-55).

(56) References Cited

OTHER PUBLICATIONS

Tan, Keng T. et al., "A color 2D-barcode for mobile applications; Design tips," 2011 IEEE Pervasive Computing, vol. PP, No. 99 (pp. 1-19).

Wakahara, Toshihiko et al., "Image Processing of 2-Dimensional Barcode," 2011 in International Conference on Network-Based Information Systems (pp. 484-490).

Wissner-Gross, Alexander D. et al., "Multicolor symbology for remotely scannable 2D barcodes," 2007 in International Symposium on Photoelectronic Detection and Imaging: Image Processing (pp. 662304-1-662304-4).

Bogataj, Urska et al., "Multi-color 2D Datamatrix Codes With Poorly Readable Colors," 2010, Journal of Graphic Engineering and Design, vol. 1 (pp. 1-8).

* cited by examiner

Figs. 1(a) – (d)
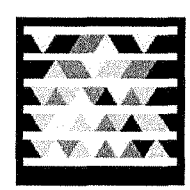
(a) QR     (b) Aztec     (c) Data Matrix     (d) HCCB
Prior Art
Fig. 2
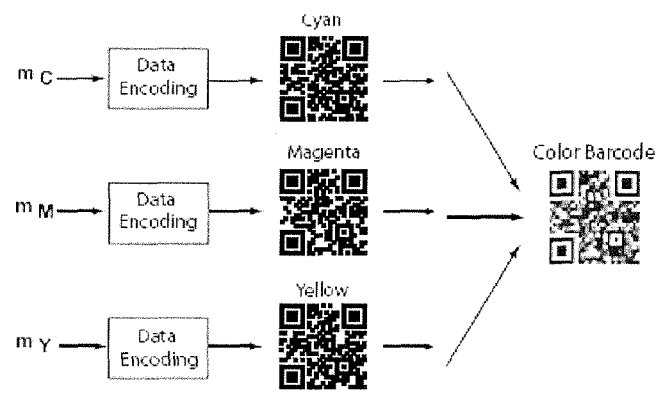

TABLE II

DEVICES USED IN EXPERIMENTS. † AND + INDICATE DEVICES USED ONLY IN FIRST AND SECOND ROUND EXPERIMENTS, RESPECTIVELY (a) Phones

| ID | Make and Model | Sensor Size, MP | Autofocus |
|---|---|---|---|
| 1 | LG Ally† | 3.2 | ✓ |
| 2 | iPhone 4 | 5.0 | ✓ |
| 3 | iPhone 3GS | 3.0 | ✓ |
| 4 | iPhone 3G† | 2.0 | |
| 5 | Nokia C6 | 5.0 | ✓ |
| 6 | Samsung Intercept | 3.2 | ✓ |
| 7 | Motorola Droid X | 8.0 | ✓ |
| 8 | Motorola Droid | 5.0 | ✓ |
| 9 | Blackberry 8900 Curve | 3.2 | ✓ |
| 10 | Nokia N900 | 5.0 | ✓ |
| 11 | LG VX9900 + | 2.0 | ✓ |

(b) Printers. ‡ indicates a solid ink printer.

| ID | Make and Model | Laser | Inkjet |
|---|---|---|---|
| 1 | HP OfficeJet 6500 | | ✓ |
| 2 | HP Color LaserJet 4700 | ✓ | |
| 3 | Ricoh Aficio MPC2550 | ✓ | |
| 4 | HP Color LaserJet 4650 | ✓ | |
| 5 | Epson Stylus NX215 | | ✓ |
| 6 | Dell Printer 948 | | ✓ |
| 7 | Xerox WorkCentre 7665 | ✓ | |
| 8 | Xerox Phaser 8860‡ | | ✓ |
| 9 | Ricoh Aficio MPC4501 | ✓ | |
| 10 | HP Color LaserJet 5550 | ✓ | |

FIG. 5

TABLE III

PERCENT BERs AND SSRs (SYNCHRONIZATION SUCCESS RATES) FOR COLOR QR CODES WITH THE PROPOSED INTERFERENCE CANCELLATION (Int. Cancellation) APPROACHES (PB+AT, PB+LT) AND ALTERNATIVE APPROACHES (AT, LT)

| Size | | Estimated Cyan | | | | Estimated Magenta | | | | Estimated Yellow | | | |
|---|---|---|---|---|---|---|---|---|---|---|---|---|---|
| | | Int. cancellation | | | | Int. cancellation | | | | Int. cancellation | | | |
| | | PB+AT | PB+LT | AT | LT | PB+AT | PB+LT | AT | LT | PB+AT | PB+LT | AT | LT |
| 15 mm | BER | 9.23 | 1.72 | 5.09 | 1.49 | 8.37 | 5.69 | 12.28 | 8.71 | 6.88 | 6.48 | 20.66 | 17.45 |
| | SSR | 82.36 | 82.36 | 82.16 | 82.16 | 82.36 | 82.36 | 80.36 | 82.16 | 82.36 | 82.36 | 82.16 | 82.16 |
| 20 mm | BER | 5.02 | 0.87 | 2.49 | 2.16 | 5.57 | 4.25 | 10.44 | 7.61 | 5.13 | 5.39 | 18.18 | 17.59 |
| | SSR | 92.40 | 92.60 | 92.60 | 92.60 | 92.60 | 92.60 | 92.00 | 92.00 | 92.60 | 92.60 | 92.60 | 92.60 |
| 25 mm | BER | 1.21 | 0.55 | 0.57 | 0.47 | 3.11 | 3.03 | 8.77 | 5.76 | 3.42 | 4.56 | 15.14 | 15.31 |
| | SSR | 91.40 | 91.40 | 91.20 | 91.40 | 91.40 | 91.40 | 90.80 | 91.20 | 91.40 | 91.40 | 91.20 | 91.40 |
| 30 mm | BER | 0.70 | 0.58 | 0.15 | 0.27 | 2.73 | 2.47 | 7.31 | 4.60 | 3.37 | 3.88 | 16.83 | 13.64 |
| | SSR | 90.16 | 90.16 | 90.16 | 90.16 | 90.16 | 90.16 | 90.16 | 89.96 | 90.16 | 90.16 | 89.96 | 90.16 |
| Total | BER | 3.92 | 0.91 | 2.00 | 1.09 | 4.87 | 3.82 | 9.63 | 6.63 | 4.65 | 5.05 | 17.64 | 15.97 |
| | SSR | 89.08 | 89.13 | 89.03 | 89.08 | 89.13 | 89.13 | 88.33 | 88.83 | 89.13 | 89.13 | 88.98 | 89.08 |

FIG. 8

TABLE IV

PERCENT BERs AND SSRs (SYNCHRONIZATION SUCCESS RATES) RATES FOR COLOR AZTEC CODES WITH THE PROPOSED INTERFERENCE CANCELLATION (Int. Cancellation) APPROACHES (PB+AT, PB+LT) AND ALTERNATIVE APPROACHES (AT, LT)

| Size | | Estimated Cyan | | | | Estimated Magenta | | | | Estimated Yellow | | | |
|---|---|---|---|---|---|---|---|---|---|---|---|---|---|
| | | Int. cancellation | | | | Int. cancellation | | | | Int. cancellation | | | |
| | | PB+AT | PB+LT | AT | LT | PB+AT | PB+LT | AT | LT | PB+AT | PB+LT | AT | LT |
| 15 mm | BER | 2.01 | 2.16 | 1.94 | 2.18 | 1.17 | 1.32 | 1.45 | 1.51 | 1.70 | 2.25 | 2.08 | - |
| | SSR | 20.61 | 15.36 | 21.21 | 16.16 | 10.51 | 10.10 | 10.91 | 1.41 | 7.47 | 1.01 | 0.40 | 0.00 |
| 20 mm | BER | 1.24 | 1.51 | 1.22 | 1.39 | 0.86 | 1.00 | 1.00 | 1.34 | 1.35 | 1.68 | 1.23 | - |
| | SSR | 48.78 | 40.69 | 54.86 | 46.15 | 41.30 | 30.57 | 35.22 | 8.79 | 29.55 | 15.18 | 4.45 | 0.00 |
| 25 mm | BER | 0.85 | 1.14 | 0.82 | 1.07 | 0.79 | 0.97 | 0.90 | 1.23 | 0.98 | 1.36 | 1.47 | 2.38 |
| | SSR | 69.29 | 63.64 | 73.33 | 69.99 | 64.24 | 49.29 | 54.55 | 20.40 | 49.09 | 33.74 | 9.90 | 1.41 |
| 30 mm | BER | 0.68 | 0.86 | 0.59 | 0.76 | 0.73 | 0.80 | 0.89 | 1.19 | 1.01 | 1.22 | 1.61 | 1.72 |
| | SSR | 75.15 | 70.91 | 80.81 | 77.17 | 74.75 | 54.95 | 60.40 | 23.84 | 56.77 | 38.99 | 13.15 | 1.62 |
| Total | BER | 0.99 | 1.20 | 0.94 | 1.11 | 0.81 | 0.94 | 0.95 | 1.34 | 1.11 | 1.36 | 1.52 | 2.03 |
| | SSR | 53.46 | 47.70 | 57.55 | 52.35 | 47.70 | 36.23 | 40.27 | 13.59 | 35.73 | 22.23 | 7.48 | 0.76 |

FIG. 9

TABLE V

PERCENT SSRs AND DSRs (SYNCHRONIZATION AND DECODING SUCCESS RATES) FOR COLOR QR CODES UTILIZING THE PROPOSED INTERFERENCE CANCELLATION (Int. Cancellation) APPROACHES (PB+AT, PB+LT, EM) AND ALTERNATIVE APPROACHES (AT, LT). FOR BENCHMARKING PURPOSES, THE CORRESPONDING RATES FOR MONOCHROME BARCODES CAPTURED IN SIMILAR SETTINGS ARE ALSO INDICATED

| EC | | Estimated Cyan | | | | | Estimated Magenta | | | | | Estimated Yellow | | | | | Monochrome |
|---|---|---|---|---|---|---|---|---|---|---|---|---|---|---|---|---|---|
| | | Int. cancellation | | | AT | LT | Int. cancellation | | | AT | LT | Int. cancellation | | | AT | LT | |
| | | PB+AT | PB+LT | EM | | | PB+AT | PB+LT | EM | | | PB+AT | PB+LT | EM | | | |
| L | SSR | 95.56 | 95.56 | 95.56 | 95.56 | 95.56 | 95.56 | 95.56 | 95.56 | 95.56 | 95.56 | 95.56 | 95.56 | 95.56 | 95.56 | 95.56 | 85.19 |
| | DSR | 100 | 100 | 83.72 | 90.70 | 100 | 100 | 41.86 | 81.40 | 39.53 | 69.77 | 20.93 | 6.98 | 46.51 | 0 | 0 | 98.26 |
| M | SSR | 93.33 | 93.33 | 93.33 | 93.33 | 93.33 | 93.33 | 93.33 | 93.33 | 93.33 | 93.33 | 93.33 | 93.33 | 93.33 | 93.33 | 93.33 | 95.38 |
| | DSR | 100 | 100 | 85.71 | 92.86 | 100 | 100 | 38.10 | 88.10 | 52.38 | 40.48 | 45.24 | 26.19 | 54.76 | 0 | 0 | 100 |
| Q | SSR | 95.56 | 95.56 | 95.56 | 95.56 | 95.56 | 95.56 | 95.56 | 95.56 | 95.56 | 95.56 | 95.56 | 95.56 | 95.56 | 95.56 | 95.56 | 88.89 |
| | DSR | 97.67 | 100 | 88.37 | 95.35 | 100 | 100 | 34.88 | 81.40 | 55.81 | 58.14 | 30.23 | 44.19 | 58.14 | 0 | 0 | 100 |
| H | SSR | 95.56 | 95.56 | 95.56 | 95.56 | 95.56 | 95.56 | 95.56 | 95.56 | 79.07 | 41.86 | 58.14 | 95.56 | 95.56 | 48.84 | 95.56 | 2.33 | 87.41 |
| | DSR | 100 | 100 | 90.70 | 100 | 100 | 100 | 86.05 | 95.56 | 79.07 | 41.86 | 58.14 | 37.21 | 25.58 | 48.84 | 0 | 100 |
| Total | SSR | 95.00 | 95.00 | 95.00 | 95.00 | 95.00 | 95.00 | 95.00 | 95.00 | 82.46 | 47.37 | 56.73 | 95.00 | 95.00 | 52.05 | 95.00 | 0.58 | 89.16 |
| | DSR | 99.42 | 100 | 87.13 | 94.74 | 100 | 100 | 95.91 | 50.29 | | | | 33.33 | 25.73 | | 0 | 99.58 |

FIG. 13

TABLE VI

PERCENT SSRs AND DSRs (SYNCHRONIZATION AND DECODING SUCCESS RATES) FOR COLOR AZTEC CODES UTILIZING THE PROPOSED INTERFERENCE CANCELLATION (Int. Cancellation) APPROACHES (PB+AT, PB+LT, EM) AND ALTERNATIVE APPROACHES (AT, LT). FOR BENCHMARKING PURPOSES, THE CORRESPONDING RATES FOR MONOCHROME BARCODES CAPTURED IN SIMILAR SETTINGS ARE ALSO INDICATED

| | Estimated Cyan | | | | | Estimated Magenta | | | | | Estimated Yellow | | | | | Monochrome |
|---|---|---|---|---|---|---|---|---|---|---|---|---|---|---|---|---|
| | Int. cancellation | | | AT | LT | Int. cancellation | | | AT | LT | Int. cancellation | | | AT | LT | |
| | PB+AT | PB+LT | EM | | | PB+AT | PB+LT | EM | | | PB+AT | PB+LT | EM | | | |
| SSR | 75.56 | 77.78 | 55.26 | 75.56 | 75.56 | 75.56 | 55.56 | 55.26 | 77.78 | 48.89 | 57.78 | 33.33 | 42.11 | 4.44 | 0 | 67.91 |
| DSR | 100 | 100 | 100 | 100 | 100 | 100 | 100 | 100 | 100 | 100 | 100 | 100 | 100 | 0 | 0 | 100 |

FIG. 14

TABLE VII

DECODING TIME, MILLISECONDS

| Operation | QR | | Aztec | |
|---|---|---|---|---|
| | Color | Black | Color | Black |
| Binarization | 827.763 | 257.139 | 786.274 | 294.336 |
| Geometry estimation | 6.199 | 3.576 | 0.368 | 0.710 |
| Pilot colors sampling | 0.681 | — | 0.084 | — |
| Conversion matrix est. | 1.116 | — | 1.123 | — |
| Adaptive thresholds comp. | 0.021 | — | 0.020 | — |
| Interference cancellation | 4.271 | — | 638.074 | — |
| Bitstreams decoding | 0.386 | 0.146 | 0.223 | 0.076 |
| Total | 840.483 | 260.860 | 1426.139 | 295.122 |

TABLE VIII
BIT ERROR RATES IN COLOR CHANNELS, OBTAINED FROM RGB SCAN CHANNELS AND BY UTILIZING THE PROPOSED COLOR INTERFERENCE CANCELLATION ALGORITHM

|  | Estimated Cyan | Estimated Magenta | Estimated Yellow |
|---|---|---|---|
| Without Int. Cancellation | 0.10 | 0.03 | 0.28 |
| Proposed EM-style Cancellation | 0.10 | 0 | 0.10 |

COLOR BARCODES FOR MOBILE APPLICATIONS: A PER CHANNEL FRAMEWORK

CROSS-REFERENCE TO RELATED APPLICATIONS

This application claims priority to and the benefit of U.S. provisional patent application Ser. No. 61/546,209, Color Barcodes for Mobile Applications: A Per Channel Framework, filed Oct. 12, 2011, which application is incorporated herein by reference in its entirety.

BACKGROUND OF THE INVENTION

1. Field of the Invention

The present invention relates to a system and method encoding and decoding barcodes. More specifically, the present invention relates to a method and system for encoding and decoding a two-dimensional color barcode.

2. Description of the Prior Art

Monochrome 2-D barcodes, a natural extension of 1-D counterparts, have become omnipresent with the increased popularity of mobile imaging devices, facilitating the emergence of a number of mobile applications. Optical machine readable encodings of digital data in image formats, commonly referred to as barcodes, have long been utilized for tagging objects with identification and tracking data for automating sales and inventory tracking tasks. The barcode name is derived from the traditional one-dimensional version of such encodings, where vertical bars are utilized to represent data, but is now used more generically to encompass almost all forms of data encoding in image formats that use either one-dimensional or two-dimensional (2-D) representations.

Monochrome 2-D barcodes have recently become very popular in mobile applications for a couple of reasons. Firstly, the camera phones inherently capture 2-D images and can therefore be directly used with 2-D barcodes, unlike conventional laser-based 1-D barcode scanners that would require hardware modifications for capturing 2-D barcode images. Secondly, equally importantly, the 2-D codes offer high enough rates (per unit substrate area) to provide a viable mechanism for bridging between the physical world of print and the cyber world of the Internet. In particular, the most common uses of 2-D barcodes are for the purpose of facilitating access to online information about products and services advertised in print media such as magazines, posters, and billboards. The universal resource locator (URL) for the online information is embedded within the print as a 2-D barcode, which can be captured with a cell phone camera, and, upon decoding, allow the user to access the information without the tedium of manually entering the URL. Among the various options available for 2-D barcodes, for mobile applications, the (monochrome) quick response (QR) code is used most extensively in practice. The QR code standard defines a flexible solution with competitive data rates, support for multiple character sets, features for rapid and robust synchronization under lighting and orientation variations, multiple data density designs, and built in variable error correction capability for handling differing application requirements.

Although 2-D codes have higher capacity than their 1-D counterparts, innovations that further increase their capacity are of considerable interest because they allow for either: a) a reduction in the substrate foot-print that these codes consume in print media, b) additional information with the same substrate footprint, c) greater robustness, or some combination thereof. Specifically, in situations where 2-D barcodes are used to connect a user with a URL associated with a product advertisement, the additional data capacity can be utilized for encoding information on the publication or location of the advertisement, which can be invaluable for assessing effectiveness of advertisement and corresponding ad-monetization.

FIGS. 1 (a)-(c) show the most popular monochrome 2-D barcodes being used in several applications. Although designs of these barcodes are perceptually very different, all of them share common characteristics. A 2-D barcode is typically composed of synchronization symbols and a data field. Synchronization symbols, also called finder patterns, are independent of the encoded information and enable barcode localization in the captured image. The data is encoded, typically in the form of black and white rectangular symbols, in the remaining barcode region called the data field. Most barcodes use a form of error correction codes such as the Reed-Solomon, to account for possible errors during the acquisition phase. Table 1 provides the average parameters for a QR code.

TABLE 1

AVERAGE QR CODE PARAMETERS USED IN COMMERCIAL APPLICATIONS.

| Property | Value |
| --- | --- |
| Dimension (mm) | 21.8 × 21.8 |
| Num. of modules | 29 × 29 |
| Module size (mm) | 0.75 |
| Avg. data length (bytes) | 32 |

The Quick Response code ("QR code") encodes data in a grid spanning three distinct synchronization symbols located at the corners of the barcode as shown in FIG. 1 (a). QR code is the most commonly used barcode in mobile applications due to its capacity (upto 3000 bytes), flexibility and robustness, and having no license fee for commercial use. Similarly, Aztec code is frequently used in electronic ticketing applications. Symbols are arranged in layers winding around the central localization and synchronization symbol. Aztec code can encode upto 2000 bytes and has a better ratio of the data field to finder pattern size compared to the QR, but is significantly more sensitive to localization errors.

In order to increase the data rates of monochrome 2-D barcodes, color barcodes have recently been proposed for mobile applications. Amongst the most popular solutions are Microsoft High Capacity Color Barcode. The High Capacity Color Barcode is the one of the first barcode designs that exploits color for encoding data. The barcode is composed of a number of colored triangles arranged in rows on a black background as shown in FIG. 1 (d). Those rows are interleaved with white lines that are used for orientation and synchronization. Selected triangular symbols in the bottom-most row provide color reference. The ColorCode is another design that uses color to encode data. It is a 5×5 matrix of colored squares, of which an 'L' shaped border is used for synchronization and parity check. Current version of the barcode supports encoding of only 10 digits.

There is a need for alternative techniques for encoding data in color barcodes that offer higher data rates than existing monochrome designs and greater robustness and simplicity than the existing color barcode technology options. The present invention addresses these needs.

SUMMARY OF THE INVENTION

Because cell phone cameras inherently capture color rather than monochrome images, a way to increase the capacity of 2-D barcodes for mobile applications, is to exploit the "spectrum diversity" that the red (R), green (G), blue (B) camera (e.g., capture) color channels offer. This approach is also attractive because magazines, newspapers, posters, and billboards, in which barcodes are commonly embedded for providing mobile connectivity, are already printed in color, with the exception of the barcode region.

A new framework for extending monochrome barcodes to color is provided. The new framework offers higher data rates and enables new functionalities than are available with conventional monochrome barcodes. In an embodiment of the present invention, the framework encodes independent data in each of the cyan, magenta, and yellow print colorant channels commonly used in color printing and decodes the data from each of the complementary red, green, and blue channels in capture color channels. The framework effectively increases the capacity of monochrome barcodes by a factor of three. In an embodiment of the present invention, a physical model based approach is adopted to mitigate the effect of cross-channel interference among the print-colorant channels and capture color channels. In an embodiment of the invention, a pilot block methodology is proposed to estimate the model parameters and enable cross-channel interference cancellation. In another embodiment of the invention, an expectation maximization (EM)-type methodology is proposed to estimate the model parameters and enable cross-channel interference cancellation.

BRIEF DESCRIPTION OF THE DRAWINGS

The embodiments of the invention are pointed out with particularity in the appended claims. However, other objects and advantages together with the operation of the invention may be better understood by reference to the following detailed description taken in connection with the following illustrations, wherein:

FIGS. 1(a)-(d) depict prior art 2-D barcodes encoding the University of Rochester website URL: http://www.rochester.edu.

FIG. 2 depicts per-channel based data encoding using three print colorant layers of Cyan, Magenta, and Yellow according to an embodiment of the present invention.

FIG. 5 shows a Table II of phone and printer devices used in the experiments.

FIG. 8 shows a Table III of QR code bit error and success rates.

FIG. 9 shows a Table IV of Aztec code bit error and success rates.

FIG. 13 shows a Table V of QR code synchronization rates and decoding rates.

FIG. 14 shows a Table VI of Aztec code synchronization rates and decoding rates.

DETAILED DESCRIPTION OF THE INVENTION

This application hereby incorporates by reference in its entirety U.S. provisional application No. 61/546,209 filed Oct. 12, 2011. In order to better illustrate the advantages of the invention and its contributions to the art, embodiments of the invention will now be described in detail.

A method and system for encoding and decoding a two-dimensional color barcode according to an embodiment of the invention is provided. According to an embodiment of the invention, the system includes a processor to execute computer program instructions, a memory to store the computer program instructions executable by the processor; and computer program instructions stored in the memory and executable to perform the method of encoding and decoding a two-dimensional color barcode. In an embodiment of the invention, the method of data encoding includes extending monochrome barcodes to color printed using three layers of Cyan ("C"), Magenta ("M") and Yellow ("Y") colorants corresponding to the subtractive color primaries. As shown in the FIG. 2 embodiment of the invention, each colorant layer carries independent data m1, m2, and m3. The colorant layers are printed in overlay, and thereby physically superimposed, to generate the 2-D color barcode. Data is encoded in each colorant layer utilizing the error correction coding available to monochrome counterpart to allow error recovery for data extraction from a capture of the barcode.

In an embodiment of the invention, the method enables encoding of one or more colorant layers at different times. In an embodiment of the invention, the method enables encoding of one or more colorant layers at different locations. In an embodiment of the invention, the synchronization patterns are provided in a plurality of regions for the 2-D color barcode wherein at least two different spatial regions of said patterns are comprised of different pre-determined combinations formed by choosing one or more of the colorants. In an embodiment of the invention, a colorant layer can encode data including, but not limited to, a universal resource locator, information about services, products, entities, individuals, and tracking data.

Figure 3:
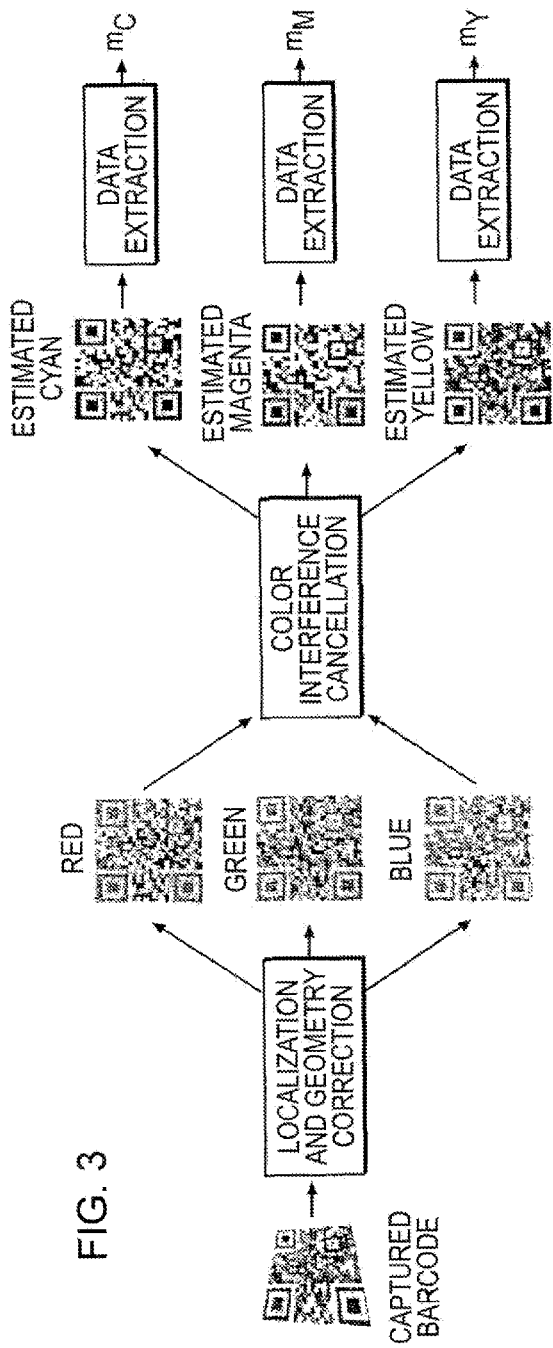
FIG. 3 depicts data recovery using color interference cancellation according to an embodiment of the present invention.

In an embodiment of the invention, the method of decoding a two-dimensional color barcode includes recovering the data embedded in the barcode from a captured image. In an embodiment of the present invention, the image of the 2-D color barcode is captured with a camera including, but not limited to, a cell phone camera. FIG. 3 shows the data recovery process according to an embodiment of the invention. In the FIG. 3 embodiment of the invention, the captured 2-D color barcode is first localized and separated into R, G and B color channels, typically used in capture devices. Ideally, the R, G, and B channels of localized captured 2-D color barcode correspond to inverted versions of the complementary C, M, and Y colorant layers with no cross-interactions between the camera channels and the non-complementary colorants. The encoded data in C, M, and Y print colorants would then be extracted from R, G, and B capture channels, respectively.

In reality, however, there is significant cross-channel coupling among the printer and camera color channels as shown in FIG. 3. In an embodiment of the invention, the R, G, and B camera sensor channels capture not only the complementary C, M, and Y printer colorant channels but also see significant interference from other non-complementary channels. Empirical evidence based on practice of the embodiments of the inventions suggests that the color interference is more pronounced in green and blue sensor channels due to the spectral characteristics of the subtractive printing primaries and additive capture channels; this information may be exploited in the decoding process though is not essential for practicing the proposed invention. In order to recover the encoded data from each color channel according to an embodiment of the invention, a color interference cancellation algorithm that estimates the C, M and Y colorant layers from the R, G, and B channels of the captured barcode is provided. The encoded data is then extracted from each estimated colorant channel. The steps shown in FIG. 3 are described next in detail.

In an embodiment of the invention, the method performs localization since the 2-D color barcode captured with a cell phone is typically geometrically distorted. The invention contemplates using different localization techniques to compensate for geometric distortions for different barcodes. In an embodiment of the invention, a localization technique is performed by converting the captured barcode from color to grayscale and using the same localization algorithm of the monochrome counterpart on the grayscale image.

In an embodiment of the invention, the method performs color interference cancellation to overcome the cross-channel color-interference utilizing a physical model for the print and capture process. In an embodiment of the invention, the C, M, and Y colorants are transparent (e.g., non-scattering). The print is modeled using the transparent version of Kubelka-Munk theory, or the Beer-Bouguer law, as $(t_i(\lambda))^2 = 10^{-d_i(\lambda)}$, where $d_i(\lambda)$ is the optical density for the $i^{th}$ colorant layer (under to and fro passage), where ($i \in \{C,M,Y\}$). The binary colorant layers of the 2-D color barcode are represented as bi-level images $I_i(x, y)$ ($i \in \{C,M,Y\}$), where $I_i(x, y)$ is '1' in regions where the $i^{th}$ colorant is printed and '0', otherwise. The spatial pattern of spectral reflectance of the printed barcode can then be approximated as:

$$r(x,y;\lambda) = r_w(\lambda) 10^{-\Sigma_{i \in \{C,M,Y\}} d_i(\lambda) I_i(x,y)} \quad (1)$$

where $r_w(\lambda)$ is the spectral reflectance of the barcode substrate (e.g., paper).

If the spectral sensitivity of the R, G, B capture channels is represented by $s_k(\lambda)$, $k \in \{R,G,B\}$, the three channels in the image captured by the digital camera can be expressed as $I_k^s(x, y) = \int s_k(\lambda) r(x, y; \lambda) d\lambda$. In an embodiment of the invention, due to variations in lighting, the model does not apply on an absolute basis. In an embodiment of the invention, the spatial variations in lighting, however, impact all colorant channels identically and can be handled after our proposed processing. We further approximate the spectral sensitivities of R, G, B camera color channels as Dirac delta functions $s_k(\lambda) = \alpha_k \delta(\lambda - \lambda_k)$ at corresponding wavelengths $\lambda_k$, $k \in \{R, G, B\}$, which, with allows us to write the normalized optical densities corresponding to the three captured channels as $$d_k(x, y) \stackrel{def}{=} -\log_{10}\left(\frac{I_k^s(x, y)}{I_k^s(W)}\right) \quad (2)$$
$$= \sum_{i \in \{C,M,Y\}} d_k^i I_i(x, y)$$

where $I_k^s(W)$ is the captured image value corresponding to the paper substrate in the $k^{th}$ camera channel and $d_k^i = d^i(\lambda_k)$. Note that the linear relation in (2) between the densities corresponding to camera responses and print colorant channels allows us to perform interference cancellation and estimate the print colorant channels from the camera color channels provided that the optical density of the colorant layers in the camera channels $d_k^i$'s for all $k \in \{R, G, B\}$ and $i \in \{C,M,Y\}$ are available. Specifically, denoting by D the matrix whose $i^{th}$ column is $[d_R^i, d_G^i, d_B^i]^T$, we see that under the model of (2) the printed binary channels $I = [I_C, I_M, I_Y]^T$ at a given location (x, y) are obtained from the recorded density $d = [d_R^i, d_G^i, d_B^i]^T$ at that location by $$I = D^{-1} d \quad (3)$$

Although the model of (2) makes several simplifying assumptions, it captures the first-order behavior of the print and capture processes.

In an embodiment of the invention, based on (3), the printed binary channels I is estimated from the density matrix d calculated from the captured barcode. In a practical application however, we typically don't know D, which varies depending on several factors including printer, capture device, illumination etc. Two alternative approaches for estimating D include, but are not limited to, a Pilot Block Approach and EM-Type Approach.

In an embodiment of the invention, the Pilot Block Approach implements a customized design of color barcodes for the purpose of estimating D. In an embodiment of the invention a number of pilot blocks are designed in the 2-D color barcode. In the FIG. 4 embodiment of the invention, six pilot blocks are included in the design of the barcode. These pilot blocks correspond to six combinations of the colorant layers, in particular C, M, Y, CM, CY, and MY, where the latter three represent the printer blue, green, and red, respectively. In terminology used in the context of modeling color printers, these are a subset of the so-called Neugebauer printing primaries.

Figure 4:
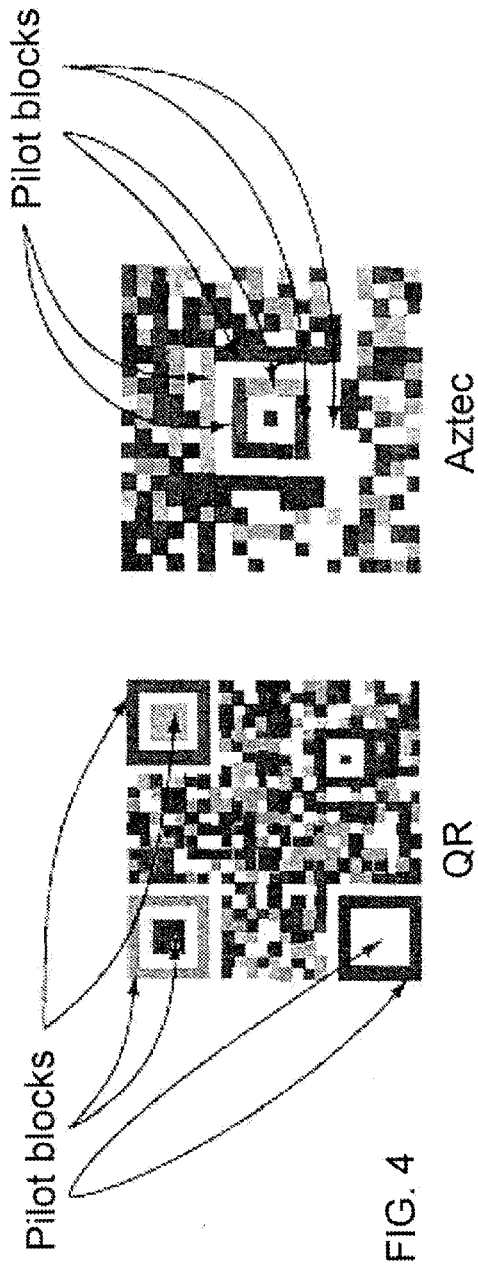
FIG. 4 depicts color barcodes created according to embodiments of the invention, the pilot blocks used for localization of the barcode are additionally printed using selected colorant combinations in order to facilitate estimation of cross-channel interference parameters in one embodiment of the invention.

In an embodiment of the invention, when encoding pilot blocks, the positioning marks available in several monochrome barcodes to allow quick detection of the barcode pattern by the decoder are used. These positioning marks do not carry data and enable synchronization at the decoder. FIG. 4 shows example pilot block encoding in positioning marks for both QR and Aztec codes. In an embodiment of the invention, when obtaining an estimate of D, the R, G, B values sensed by the digital camera for the positioning marks shown in FIG. 4 for QR and Aztec codes that correspond to printing of the colorant combinations C, M, Y, CM, CY, and MY are used. After finding the positioning marks in the barcode the normalized R, G, B channel optical densities are computed for each pixel contained inside the positioning marks and an estimate of D is obtained from these observed values and the known input values $I_C$, $I_M$, and $I_Y$ for these pixels via a constrained least-squares fit to the model of (2), where D is restricted to be positive.

In an embodiment of the invention, the EM-Type Approach provides an estimation of D without requiring pilot blocks. In an embodiment of the present invention, the EM-Type Approach uses an iterative algorithm to estimate I and D simultaneously, treating these quantities as hidden and latent variables in an expectation maximization (EM) style formulation. Specifically, the integer constraints on I are relaxed, treating these instead as variables constrained to lie between 0 and 1, which may alternatively be interpreted as probabilities of the corresponding colorant being printed at the given pixel location. The problem of estimating I and D as an optimization problem that seeks to minimize the cost function $\|DI-d\|^2$ is then formulated. Because of hidden and latent variables in the cost function, the overall estimation process as an alternating least squares minimization as indicated in Algorithm 1 is formulated. In an embodiment of the invention, each iteration of the algorithm alternates over minimization of the cost function over D and I in two sequential steps. In this process, the constraint $0 \le I \le 1$ is imposed based on our proposed relaxation and additionally, based on the physical model, we constrain D to include only positive entries. The algorithm is initialized by setting D to 3×3 identity matrix. This corresponds to the idealized assumption that the RGB sensor channels capture the printing in the complementary CMY colorants with no color interference. The algorithm is terminated once the improvement in the objective function falls below a predetermined threshold T. Note that the relaxation of the integer constraint on I in Algorithm 1 also renders the problem computationally tractable; the integer constrained problem is NP (nondeterministic polynomial time) hard. For computational and memory efficiency, the computations for Algorithm 1 may be performed over a subset of the pixels in the image. The print colorant channels I can then be estimated by using (3) with the estimate of D obtained via Algorithm 1.

binary images are obtained, from which data in each colorant channel is extracted using the data extraction algorithm of the monochrome counterpart. In the data processed to demodulate the encoded data generated by error correction coding employed in the data encoding stage as discussed above. The demodulated data is fed into the error correction decoder to compensate for the errors due to printing/capturing process and retrieve the data encoded in each printing layer. The steps for data extraction from color channels in detail are described next.

In an embodiment of the invention, Binarization is performed. Binarization includes utilizing a local thresholding algorithm. We also propose two alternative thresholding algorithms specifically for color channels, obtained by using color interference cancellation approaches, described in the preceding section. In an embodiment of the invention, the local thresholding algorithm is typically used in monochrome barcodes to account for illumination variations across the captured image. For this purpose, the image is first divided into non-overlapping blocks and average intensity is calculated for each block. The threshold for a given block is then determined using the intensity of the blocks in 5×5 neighborhood of the given block. Note that for each block a different threshold is calculated by using intensities of the local neighborhood only. In an embodiment of the invention, the Adaptive Thresholding includes printing six combinations of the colorant layers, such as C, M, Y, CM, CY, and MY, in positioning marks as shown in FIG. 4 for QR and Aztec codes. In this proposed adaptive thresholding algorithm, the intensity values at the positioning marks to set a threshold value for a color channel is utilized. In particular, we set the thresholds for estimated C, M, and Y channels as:

$$t_C = \frac{\max(I_R^C, I_R^{CM}, I_R^{CY}) + \min(I_R^M, I_R^Y, I_R^{MY})}{2} \qquad (4)$$

---

Algorithm 1: EM-type algorithm to estimate D.

--- input : RGB scan of the barcode
output: D
begin
    Initialize: Set D to 3 × 3 identity matrix ;
    repeat
        Setting D to its current estimate, minimize the cost function over I;
        $\min_I \|DI - d\|^2$
        subject to $0 \le I \le 1$
        Setting I to its current estimate, minimize the cost function over D;
        $\min_D \|DI - d\|^2$
        subject to $0 \le D$
        until improvement in cost function $\|DI - d\|^2$ is less than predefined convergence threshold $\tau$.;
end

---

Note that convergence of the alternating minimization algorithm is assured because each step in the iteration reduces the value of the cost function. In view of the probabilistic interpretation of the relaxation, the proposed methodology to find D is an EM-type algorithm that finds the local optima in the vicinity of the initialization point is introduced.

In an embodiment of the invention, Data Extraction From Color Channels is performed. In an embodiment of the invention, Data Extraction From Color Channels includes obtaining three grayscale images corresponding to C, M, and Y printing layers. These grayscale images are threshold and -continued $$t_M = \frac{\max(I_G^M, I_G^{CM}, I_G^{MY}) + \min(I_G^C, I_G^Y, I_G^{CY})}{2}$$

$$t_Y = \frac{\max(I_B^Y, I_G^{CY}, I_G^{MY}) + \min(I_G^C, I_G^M, I_G^{CM})}{2}$$

where $I_i^j$ is the intensity in the $I^{th}$ color channel $i \in \{R, G, B\}$ of the $j^{th}$ pilot block $j \in \{C, M, Y, CM, CY \; MY\}$ and $t_C$, $t_M$, $t_Y$ are the threshold values used to binarize the estimated C, M, and Y channels.

In an embodiment of the invention, Fixed Thresholding is performed: The adaptive thresholding requires the existence of the pilot colors which is only possible when the barcode is designed accordingly to allow pilot block approach for color interference cancellation. EM-type approach for color interference cancellation however, is a generic method and does not require pilot blocks. For this case, we fixed the thresholds $t_C$, $t_M$, $t_y$ for C, M, and Y channels to binarize the grayscale images In an embodiment of the invention, Data Extraction and Decoding is provided. In an embedment of the invention, the data in each colorant channel is then extracted from the binarized images of estimated C, M, and Y channels by using the decoder of the monochrome counterpart. In this extraction process, the symbols in each color channel are first demodulated to extract the data. The error correction decoder then processes the extracted data to compensate for the errors in the data.

It will be apparent to those skilled in the art that the disclosed invention may assume many other embodiments other than the embodiments described herein. Accordingly, it is intended by the appended claims to cover all such modifications of the invention which fall within the true spirit and scope of the invention.

Experimental Results: In order to evaluate the performance of the proposed framework, we selected two popular monochrome 2-D barcodes and extended their functionality to color. We chose the QR code, as being the most popular in mobile applications and the Aztec code, due to its extensive usage in electronic ticketing. We generated monochrome barcodes corresponding to each C, M. and Y print colorant channels Zint open source encoder. They were printed in overlay to generate the final color code. The same set of three strings was embedded in QR and Aztec codes and, in each of the barcode, selected modules of synchronization symbols were used as pilot blocks as shown in FIG. 4.

Figure 6:
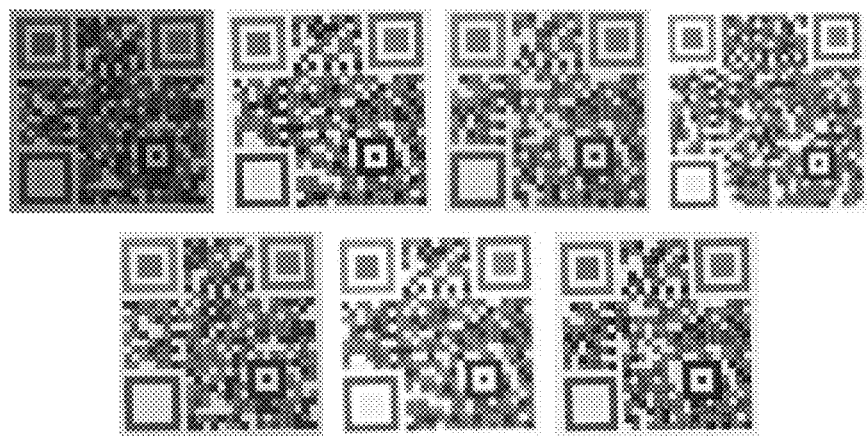
FIG. 6 shows illustrations of sample color QR code images.
Figure 7:
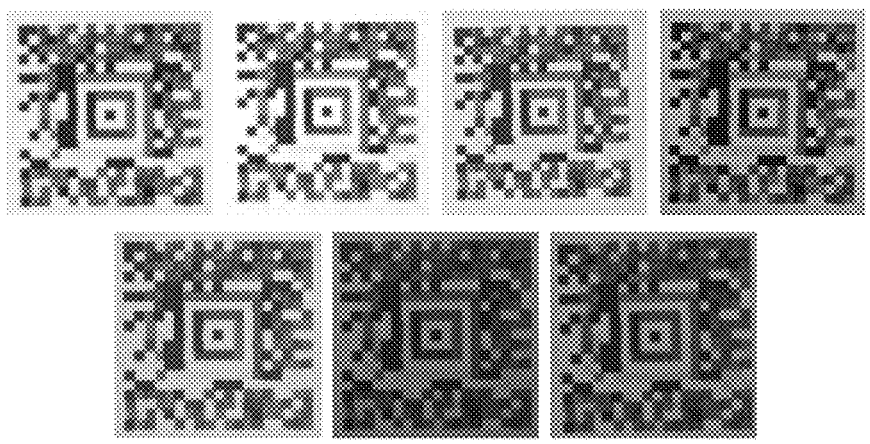
FIG. 7 shows illustrations of sample color Aztec code images.

Constructed color barcodes were printed using office printers and then captured with a variety of mobile phones, as listed in FIG. 5, Table II, under several typical lightning conditions (indoors, outdoors, fluorescent, incandescent). The highest resolution and lowest JPEG compression rate were selected for the phones that allowed changes in image acquisition settings. Images were captured in focus from an approximate distance of 15 cm from the printed barcode, FIG. 6 and FIG. 7 present example images of barcodes captured with several different mobile phone cameras.

The encoded data was extracted from the captured barcodes using the decoding software implemented in Java based on the open source ZXing (http://code.google.com/p/zxing/) decoder (http://sourceforge.net/projects/zint/), which provides core functionalities for monochrome QR and Aztec barcode decoding and EMJL (http://code.google.com/efficient-java-matrix-library) library supporting matrix operations. Acquired barcodes were decoded using five different methods. The first two were implemented for benchmarking and extracted the data by performing a thresholding operation on the R, G, and B channels of the acquired color barcode. Depending on the algorithm, these methods were called localized (LT) and adaptive (AT) thresholding. The remaining three methods implemented the proposed interference cancellation scheme as described hereinabove in order to obtain a better estimate of C, M, and Y channels. While the EM-type approach (EM) used fixed thresholding algorithm to binarize images, the pilot block approach was combined with localized (PB+LT) or adaptive (PB+AT) thresholding algorithms also as described hereinabove.

In order to evaluate the decoding performance, we used three different metrics: bit error rate (BER), synchronization rate and decoding rate. The first metric is the percentage of erroneous bits in the decoded bitstream compared to the originally embedded bitstream. Note that BER was computed on bitstreams prior to application of error correction mechanisms. The second metric, synchronization rate, gives the percentage of barcodes from the database, for which the decoder can successfully locate the barcode in the image. Finally, the decoding rate is the percentage of the synchronized barcodes, where the encoded data is recovered without any errors after error correction coding.

We performed two sets of experiments to evaluate the performance of the proposed framework. In the first experiment, we printed barcodes with varying feature size with a number of laser and inkjet printers listed in Table II(b) (FIG. 5), to determine the influence of the printer variability onto the decoding process as well as the barcode feature size that assures sufficiently high synchronization rates. In the second set of experiments, we evaluated the performance in terms of decoding ink after error correction.

Feature size and printer variability: we first evaluated the performance of the proposed framework across different printers and feature sizes. For this purpose, we generated color QR and Aztec codes in four different sizes: 15, 20, 25 and 30 mm, and printed the generated barcodes using ten different laser and inkjet printers listed in Table II(b) (FIG. 5). Each printed barcode was captured five times using ten different mobile phones as given in Table II(a) (FIG. 5). This resulted in a database containing 2,000 QR and 2,000 Aztec code images.

The acquired barcodes in the database were decoded using four different methods denoted as: LT, AT, PB+LT, and PB+AT. Note that the first two methods were implemented for benchmarking, which apply simple thresholding in individual R, G, B channels and extract the data from the thresholded color channels. PB+LT and PB+AT however, implement the proposed color interference cancellation followed by a thresholding algorithm to estimate the print colorant channels and extract the data from the estimated channels.

Figure 10:
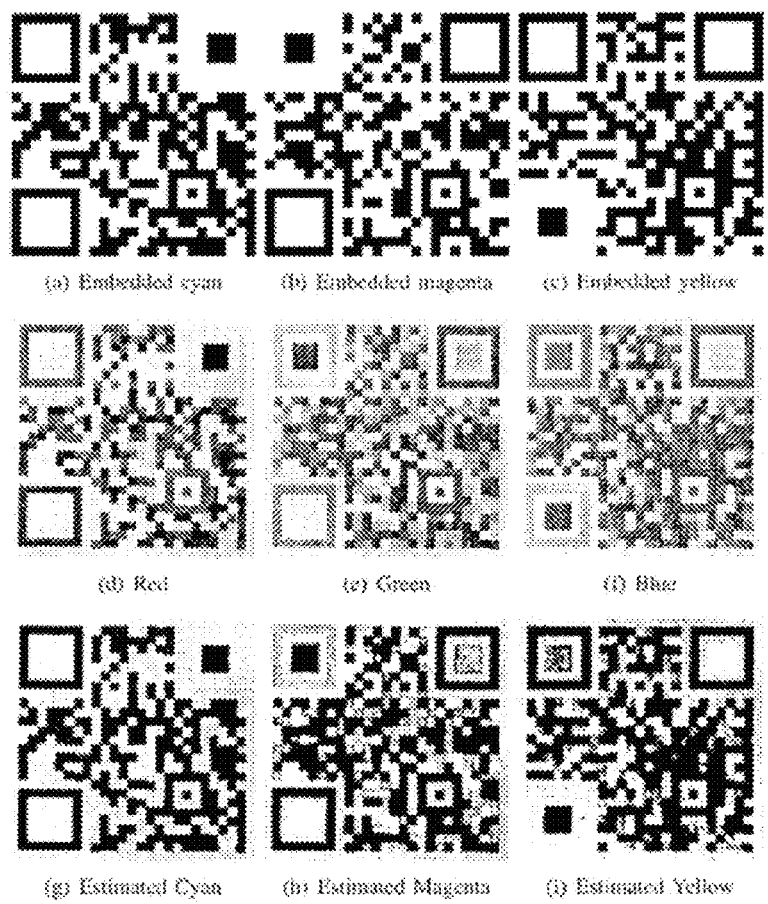
FIG. 10 shows a drawing which illustrates interference cancellation for (a) embedded cyan, (b) embedded magenta, (c) embedded yellow, (d) red, (e) green, (f) blue, (g) estimated cyan, (h) estimated magenta, and (i) estimated yellow.

Table III (FIG. 8) and Table IV (FIG. 9) tabulate the resulting bit error and the synchronization rates for color QR and Aztec codes, where B and S denote the bit error rate, and synchronization rate, respectively. As shown in the tables, the interference cancellation based techniques produce consistently lower bit error rates for all channels. In the case of cyan and magenta, the best performance is obtained when interference cancellation is combined with localized thresholding (PB+LT) accounting for lightning variation across the barcode. For the yellow channel, the adaptive thresholding produces best results since it takes into account prior knowledge of color intensities obtained from pilot blocks. The effect of interference cancellation is also shown in FIG. 10 for a QR code, where the separated color channels with and without color interference cancellation are shown side to side illustrating the benefit of the proposed interference cancellation algorithm.

Also note in Table III (FIG. 8) and Table IV (FIG. 9) that, all QR codes, with the exception of the smallest one, consistently produce synchronization rates above 90%. This implies that the feature size corresponding w the 15×15 mm barcode is too small for reliable barcode detection. The feature size of the 20×20 mm code is 0.75 mm which corresponds to the average module size of a commercially used barcode as given in Table I. We therefore, fixed the barcode size to 20×20 mm for the rest of our experiments.

Figure 11:
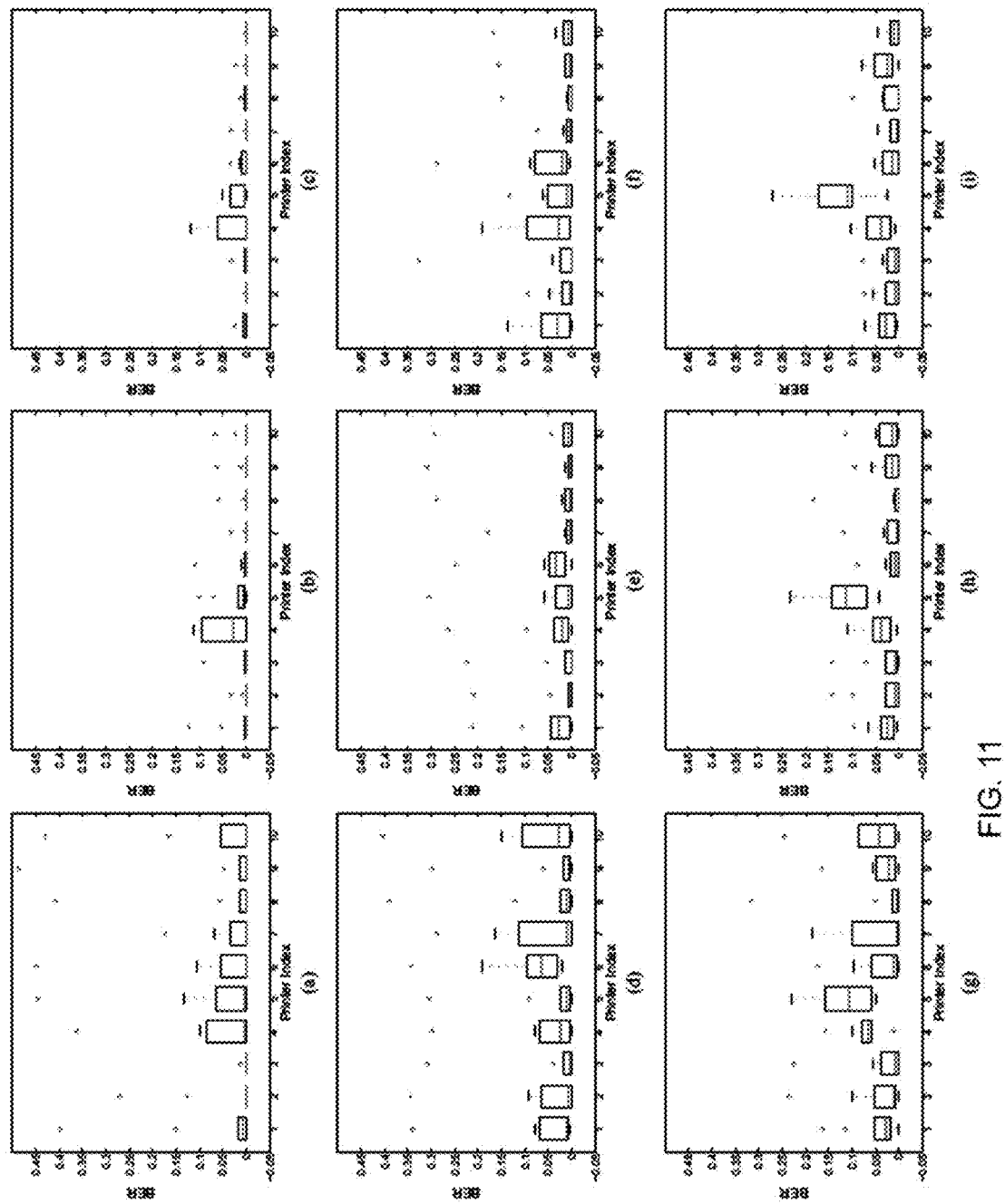
FIG. 11 shows graphs of QR code bit error rates as a function of printer and barcode size for (a) 20×20 mm, cyan; (b) 25×25 mm, cyan; (c) 30×30 mm, cyan; (d) 20×20 mm, magenta; (e) 25×25 mm, magenta; (f) 30×30 mm, magenta; (g) 20×20 mm, yellow; (h) 25×25 mm, yellow; and (i) 30×30 mm, yellow.

We also evaluated the performance across the set of printers shown in Table II (FIG. 5) using the same set of captured barcodes. The impact of printer variation on the bit error rate, however, was very limited, i.e. for a given printer there was little variability of the BER across all the phones. Bit error rate distributions for each printer over tested phones are presented in FIG. 11. The line is the median result, the top and bottom of the box denote $25^{th}$ and 75th percentile respectively. Whiskers represent the extreme values which are not outliers denoted by a '+'. Lowest rates were consistently obtained for the cyan channel, while yellow channel having more variability.

Decoding performance: We next evaluate the performance of the proposed framework in terms of decoding raw after performing the built-in error correction in monochrome barcodes. For this purpose, we generated QR codes with four error correction level settings: L (lowest), M, Q and H (highest) and generated Aztec codes with a single level error correction as the Aztec code design provides much less control over the actual level used. We set the feature: site to 0.75 mm for all barcodes, as being the smallest size offering reasonable performance in terms of bit error and synchronization rates. Corresponding to each color channel of a color barcode, we also generated a monochrome counterpart with the same data embedded, same level of error correction and feature size for benchmarking. The generated barcodes were printed on HP Color LaserJet 4700dn and the printed barcodes were captured with nine different mobile phones as shown in Table II(a) (FIG. 5). The database contained 180 images of color and 540 images of monochrome QR codes, 45 images or color and 135 images of monochrome Aztec codes.

The captured color barcodes were decoded using five different decoding methodologies as described in the experimental set-up and the monochrome barcodes were decoded using the conventional ZXing decoder. The decoding and synchronization rates for QR codes with different error correction levels are shown in Table V (FIG. 13). The overall synchronization rate for color QR codes is quite high (95%) and comparable to the synchronization rate obtained for monochrome QR code (90%). In all cases, the decoding rate in the cyan channel offers the highest performance: (approx. 90%) irrespective of the decoding method used. For the magenta channel the best decoding rate is obtained with pilot block interference cancellation algorithm followed by adaptive thresholding (PB+AT), and for the yellow channel EM-type approach for color interference cancellation achieves the best performance. Noh: that the decoding performance for yellow channel without interference cancellation is less than 3% irrespective of the thresholding algorithm applied. The proposed interference cancellation algorithm hence increase the decoding performance significantly in yellow channel and make it feasible to encode data in yellow channel in mobile applications.

Similarly, the decoding and synchronization performance for Aztec codes are shown in Table VI (FIG. 14). The performance of the Aztec code is much more affected by the synchronization performance since part of the synchronization data (specifically size of the barcode) is encoded in the data field and needs to be decoded first to estimate the full geometry of the barcode. If the size information is corrupted then the barcode geometry cannot be determined and synchronization fails. However, once the synchronization is achieved the data is always decoded as shown in the Table VI (FIG. 14) since Aztec code typically has stronger error correction mechanisms compared to the QR code. Synchronization rate is therefore a more indicative measure or performance for Aztec codes in this case. In this case, the highest rates are obtained for the interference cancellation mechanism with adaptive thresholding. These are comparable to the 68% synchronization rate of the same algorithm used on monochrome Aztec barcodes.

Figure 12A:
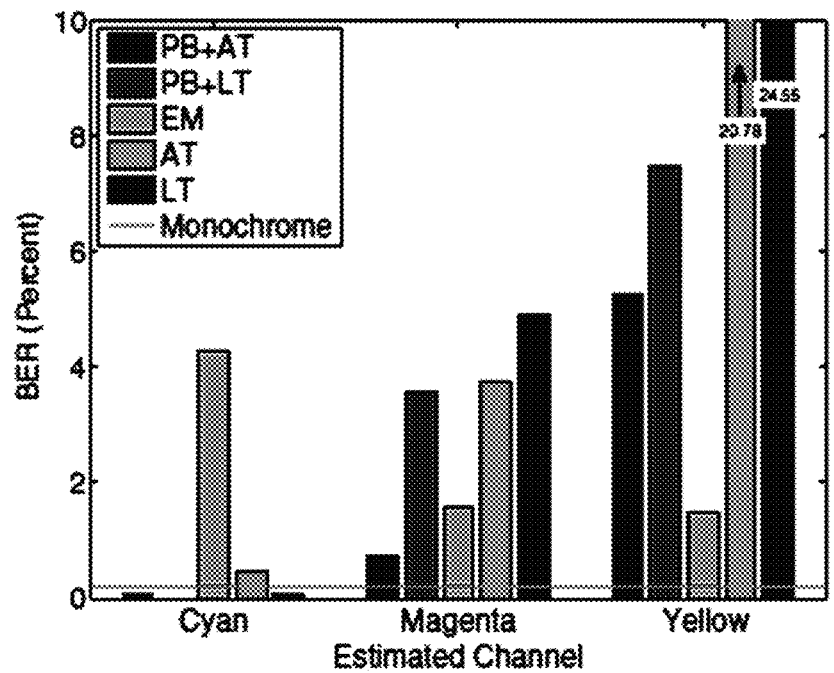
FIG. 12A shows a bar graph of QR color barcode bit error rates.
Figure 12B:
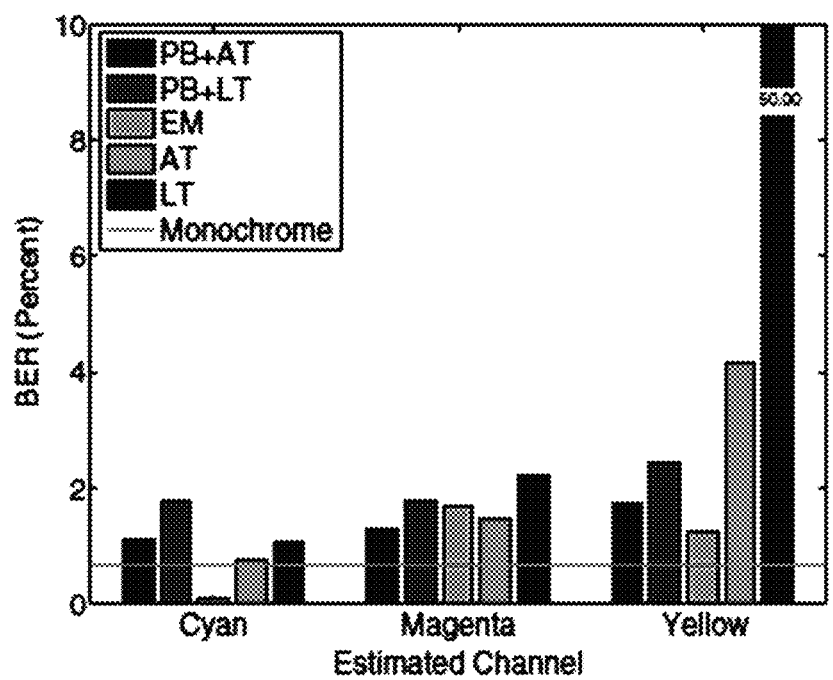
FIG. 12B shows a bar graph of Aztec color barcode bit error rates.

We also evaluated the BER performance of the barcodes before the errors are corrected. FIG. 12A and FIG. 12B show graphs of the BER performance across different decoding methodologies, where the interference cancellation based methods mitigate the effect of color interference and performs superior than simple thresholding algorithms in all cases. Note that even though the EM-type type algorithm achieves comparable decoding and synchronization rates with the pilot block approach for color interference cancellation, the BER performance is significantly higher for EM-type approach. The reason for this inferior performance is that EM-type approach converges to a local optima while performing the interference cancellation, which can be quite different than the global optima and typically leads to 50% BER in the cases where the decoding fails.

Figures 15, 16:
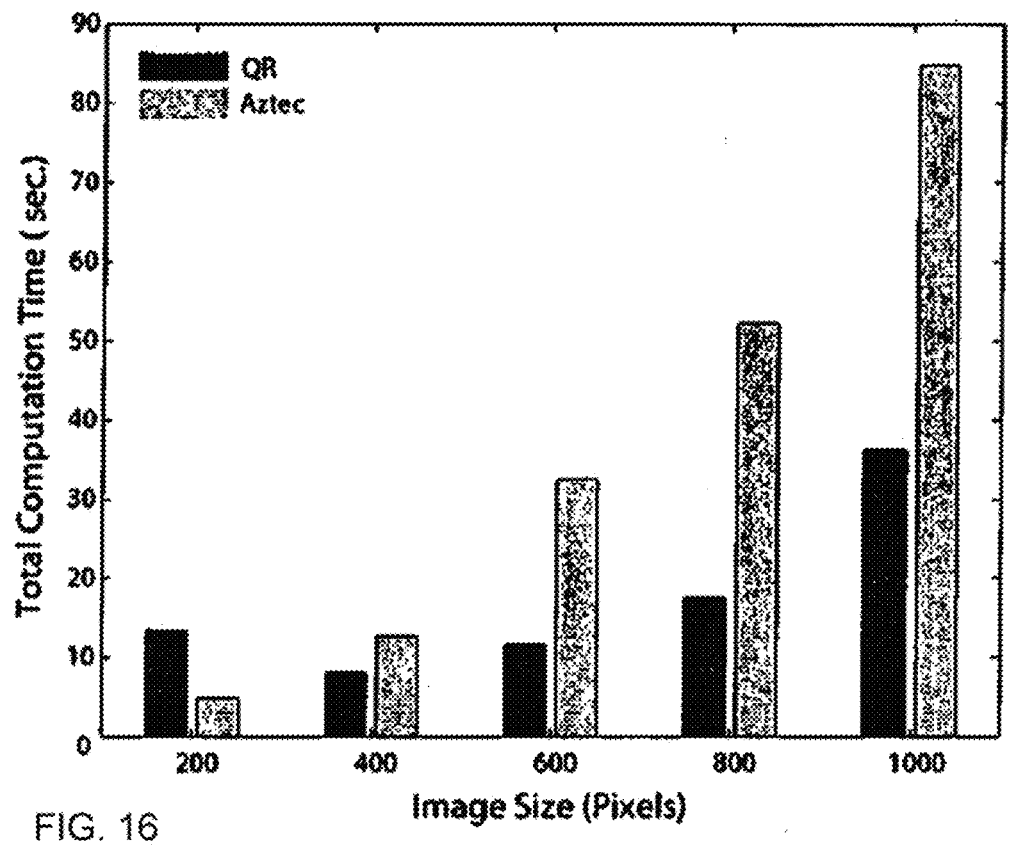
FIG. 15 shows a Table VII of decoding time.
FIG. 16 shows a bar graph of mobile device execution times.

Execution time: We finally consider the decoding time of the color barcodes with the proposed construction and decoding. Our experiments were performed on Intel Core 2.53 GHz PC. The computation times of different operations, averaged over 2000 images are summarized in table VII (FIG. 15). As is clear in the table, the most expensive part is the initial image binarization to find the position of synchronization patterns. Since no knowledge on the code location is available, this operation is performed on the full resolution captured image. The remaining operations are performed on the down sampled version of the captured barcode, which makes the processing much more efficient Execution time of many operations such as geometry, or conversion matrix estimation is independent of the type of barcode. The biggest difference between QR and Aztec codes is for the interference cancellation procedure. Complete estimation of an Aztec code geometry requires to decode part of the data field. This in turn, makes it necessary to remove cross-channel interferences from a larger section of the barcode image.

Color barcode decoding times are comparable those of classical monochrome 2D barcodes. The most expensive procedure is initial barcode binarization, which in the case of optimized code is only about three times faster than non-optimal procedure used for color barcodes. Also, a three-fold increase in the bitstream decoding time follows from analogous increase in the data capacity. Remaining operations related to color barcode processing, when compared to the initial binarization time, add little penalty, especially for the QR code.

The overall performance of the code, when executed on a mobile platform is significantly lower than for a PC. The graph of FIG. 16 summarizes the total color barcode decoding time as a function of the barcode size, when executed on an LG Ally mobile phone equipped with a single core 600 MHz processor and 256 MB of RAM. Firstly the construction of QR code makes it easier to decode individual channels, and as a result the process is consistently faster than that for the Aztec code. Naturally as the size increases, the process becomes slower, however, for the QR code, increasing the code size four times only doubles the total time. Aztec is performing much more poorly with scaling. The excessive computational time required for the smallest QR code is probably due to memory allocations done at the beginning of code execution.

Figure 17:
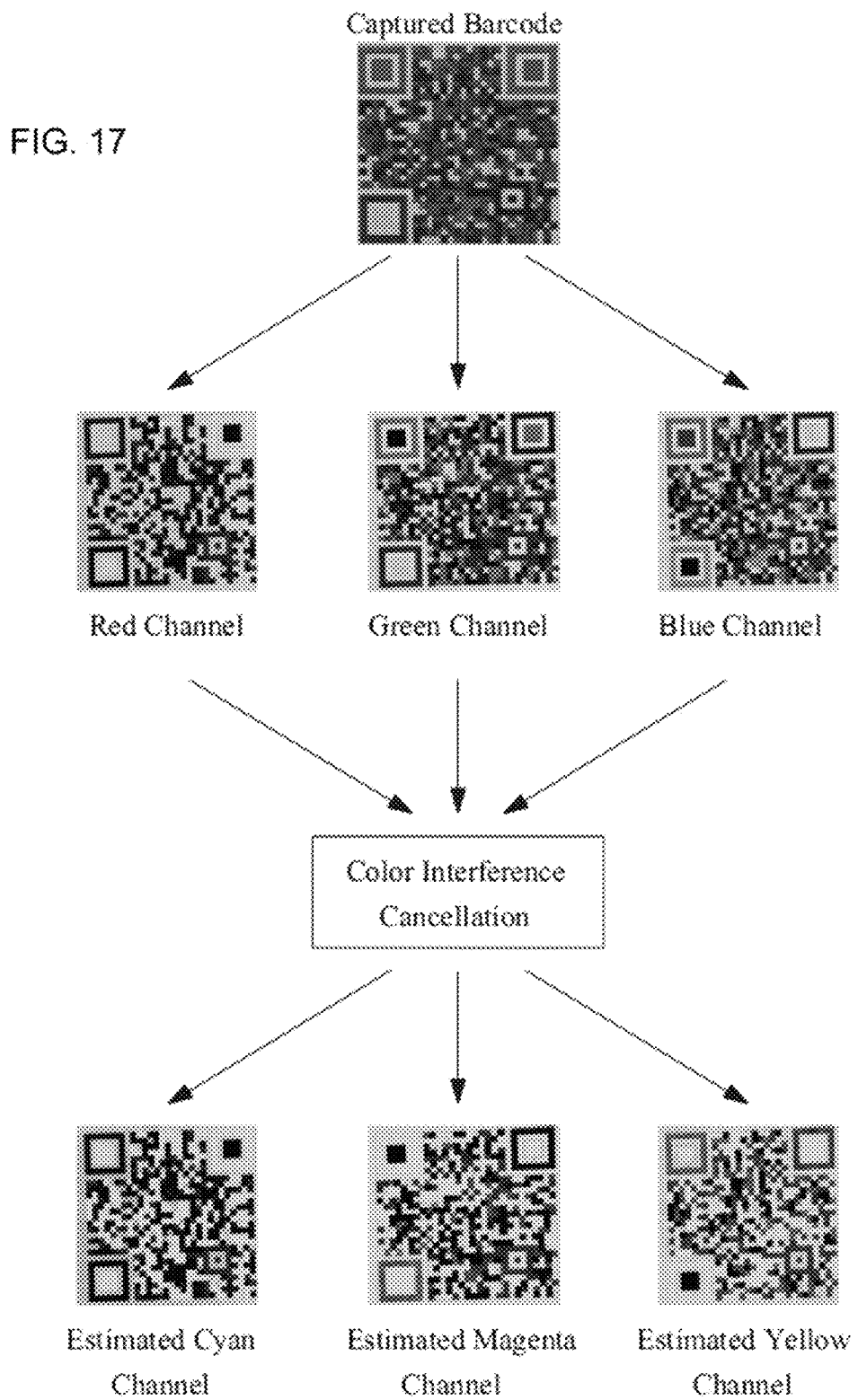
FIG. 17 shows a diagram of scanned RGB channels and estimated CMY channels after interference cancellation.

Color interference cancellation for high capacity color Barcodes using per-colorant channel data encoding via orientation modulation: We also evaluate the performance of the proposed color interference cancellation algorithm for high capacity color barcodes. For this purpose, a 2×2 inch color barcode was generated and printed on a HP Color 4700 printer with an array periodicity of 75 cells per inch (cpi) along horizontal and vertical directions for each of the CMY channels. This yields cell sizes (in printer pixel units) that provide reasonable flexibility to orient a dot along different directions within a cell and an overall data density of 16,875 bits per square inch. In each colorant channel we modulate the dot orientation along vertical or horizontal directions (i.e. 0/90° orientations) based on the randomly generated data to be encoded in the barcode. The barcode was scanned on an HP Scanjet 8270 scanner with a scanning resolution of a 1200 dots per inch (dpi) resolution for data extraction. FIG. 17 illustrates a portion of the scanned barcode and the color channels of the barcode before mid after color interference cancellation algorithm, was used for the convergence check). Note that the estimated cyan, magenta, and yellow channels with the proposed algorithm for color interference cancellation exhibit reduced color interference compared with the original RGB channels. The interference and the reduction are more pronounced when the dot orientations in the neighboring colorant channels in the spectra (i.e. cyan-magenta or magenta-yellow), do not match with each other.

Next we evaluate the bit error rates (BER) for the data embedded in each of the colorant channels in the barcodes, comparing the performance with and without color interference cancellation. The data is extracted from the estimated print colorant channels, when the proposed color interference cancellation is not employed, the data is extracted directly from RGB channels of the scanned barcode complementary to CMY print colorant channels, respectively, In each color channel, we employ Otsu's thresholding algorithm to mitigate the effect of color interference and reduce the print-scan noise that impacts the estimated orientation of elliptical-dots, After global and local synchronization, the data is extracted from the thresholded color channels by utilizing image moments as detection statistics. Table VIII (FIG. 18) lists the BER performance in estimated CMY colorant channels with and without color interference cancellation. Note that the proposed algorithm for interference cancellation significantly improves the BER performance especially in magenta and yellow channels, which are typically impacted by the color interference more dominantly. Also note that the BER performance in the cyan channel is not improved by the proposed algorithm as the red scan channel captures the cyan colorant with minimal interference from the other colorants, which is typically eliminated with the adaptive thresholding.

Figures 18, 19:
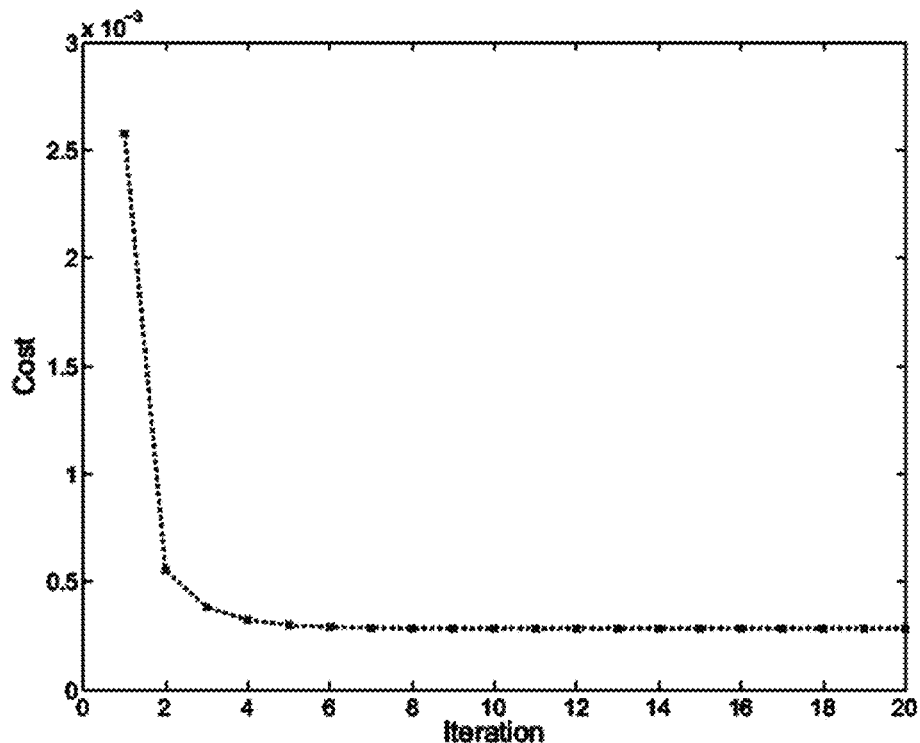
FIG. 18 shows a Table VIII of bit error rates in color channels obtained from RGB scan channels and by using a color interference cancellation algorithm.
FIG. 19 is a graph showing objective function versus iteration number illustrating convergence behavior of an estimation algorithm.

The convergence behavior of the algorithm is illustrated in FIG. 19, where the graph shows a plot of the optimization objective function as a function of the iteration number. Monotone convergence to a (local) minimum (in the vicinity of the initialization) is observed.

Applications

The additional data capacity provided by the color bar codes is particularly advantageous for the use of these codes in advertisements, which represents the primary use of black and white QR codes in mobile applications at the present time. QR codes are placed within a print or display advertisement for a product or service, where the barcode encodes a URL for a website providing additional information regarding the specific product or service. A user can capture the barcode using a camera based application on their mobile phone and quickly connect to the website for accessing the additional information without requiring tedious reading and manual entry of URLs. The color barcode in the present invention has several advantageous characteristics for these applications:

Metrics that quantify the effectiveness of advertisement are extremely important in the business world. These metrics allow companies to determine which of the many advertisements placed via different advertising channels was the most effective in eliciting responses. While this is relatively easy for online advertisements, it is a significant challenge for print and display advertising and not readily addressed by the black and white QR code designs. Usually for reasons of capacity, robustness, and ease of use, current black and white QR codes encode only the data corresponding to a URL. Thus for instance, advertisements placed in different trade magazines have the same black and white QR code, which serves the purpose of connecting interested users of each of the magazines to the website, but does not provide information on where users accessed the QR code, in particular, whether one magazine in particular was more effective than the others. The additional capacity enabled by the color barcodes can be used to embed additional tagging data that identifies the advertisement channel and venue, without compromising the capacity, robustness, and ease of use. Upon decoding by a suitable application on the mobile phone, the color barcode can then, not only connect the users mobile phone to the website with additional information, but can also communicate the tagging information to a server that gathers data on how many of the QR codes in each of the advertisement channels were actually captured by mobile phone users. This information can be subsequently mined to determine the effectiveness of different display and print advertising channels providing useful input for pricing, advertisement placing, etc.

One embodiment for incorporating the tagging information, using the present color barcode invention uses one colorant layer to encode the URL that is conventionally encoded in existing black and white QR codes and uses one of both of the other two colorant layers to embed information that identifies the advertisement channel. This layered scheme for encoding data independently in C, M, and Y channels has the advantage that the different layers can be designed and inserted in different phases offering significant design flexibility. The product company placing the advertisement is typically interested primarily in conveying a URL to the mobile user, with the layered design, the product company can simply design the image and the layer of the QR code carrying this URL once. Each time the advertisement is placed in a different advertisement channel, the other layers that carry information on where the advertisement is placed can be inserted with fresh data.

The framework of the present invention enables embedding of independent information in three colorant channels of a color barcode. The information in the three colorant channels can be combined together to obtain a block of data that is three times the data in a monochrome bar code. Alternatively, in a number of applications, the three layers can be used to advantageously encode three separate pieces of information. For instance, each of the C, M, and Y layers may encode a URL, providing three different URLs. A mobile phone reader application can then offer a user who captures the color barcode, the option to choose amongst these three URLs, thereby providing quick and ready access to three pieces of online information, without requiring the user to navigate or click on their small mobile device. The fact that the three layers can be independently generated in our proposed barcode framework provides very significant design flexibility, which is also advantageous. Whereas the decoding process for the three colorant layers is loosely coupled, it does not pose limitations for the use. Several specific examples of the use of the layered functionality are described below. When a user captures a color barcode placed on a geographically localized display, such as an advertisement poster at a bus or train stop, the reader can then bring up three options for the user to select between: the website for the closest franchise, a link providing navigation directions to the local store, and a third link to the company's online store. The design flexibility of the colorant layered approach described above also applies here; national/regional advertisements could be localized by adding the additional URLs in the additional layers at the local level instead or requiring a combined design. This is a significant advantage over alternative color barcodes that do not adopt a per-colorant layered approach.

A user capturing a color barcode at the for sale billboard outside a house can similarly be offered three options of connecting to the URL with the property listing, calling the listing real agent, or connecting to a site listing other homes for sale in the neighborhood.

For some applications, URLs tend to be long. For example, when you look up directions to go someplace on your computer and then need to drive to that location, it would be good to simply capture a displayed QR code (or printed) on your mobile device that connects directly to the map with the appropriate directions/place shown. These URLs are typically larger and would benefit from the increased capacity that we can provide.

The separation of information by colorant layer can also be used to keep information in semantically separate classes, which within the application of the barcode reader can then invoke different actions. For example, the three layers can encode a homepage, contact information, and a link to navigation directions to a specific location. Among other applications, this could be useful on business cards.

The additional capacity offered by color barcodes may also advantageously be exploited with other digital data manipulation technologies, In particular, cryptography technologies can be combined advantageously with the present invention. Some colorant layers may carry openly accessible information, whereas others may carry encrypted information or digital signatures for validating this open information. This can be useful in allowing security or privacy conscious users to validate links before connecting with a website.

Conclusion:

The framework proposed herein, provides an effective method for extending monochrome barcodes to color. Our color code constructions offer three times the data rates of their monochrome counterparts with low bit-error rates that are readily handled by the error correction coding options available in the monochrome barcode. The framework described herein can easily be adapted to any barcode scheme currently in use. The proposed construction can be performed by modifying synchronization symbols with pilot blocks which will then serve as color references in the interference cancellation algorithm, Alternatively, EM-type algorithms can be used for color interference cancellation without requiring the pilot blocks in the construction. In this way the capacity of any barcode can be tripled. Secondly, although not verified quantitatively, the proposed scheme is immune to lighting variation which is one of the major obstacles for using color in mobile barcodes. Experiments were carried out on a large database of images captured in a number of typical lighting conditions. No single type of images demonstrated consistently lower performance.

A color barcode generated with the proposed framework can be directly deployed with existing camera phones without requiring any hardware modifications because camera phones already capture color images with three R, G, B channels. On the decoder side, the migration to the new code can therefore be enabled simply by a software upgrade of existing barcode reading applications or by developing a new reader application. The software modification required is also minimal since the technique used for data embedding in each of the channels is the same us the method currently used with monochrome barcodes and only the front-end synchronization processing needs modification. On the encoder side, color printing functionality can be used to enable the proposed color barcode, which cannot be reproduced with black and white printers. This is not a significant limitation for the proposed barcodes because color is already common in printing for the application scenarios where the additional capacity offered by the color codes is most desirable, for example in printed advertisements in magazines, posters within store displays, billboards, marketing mails, etc. Even within the home environment, an increasing number of users are utilizing inkjet printers that incorporate color capability.

The proposed solution also has a few limitations. While, as demonstrated in the experiments, color barcodes are well protected against errors, if a barcode is damaged or stained, all three channels may be equally affected. Although we have not observed significant influence of the printer type onto barcode decoding, in many commercial color printers the yellow channel contains a random dot pattern that is used for identifying the printer for anti-counterfeiting purposes. The presence of these random patterns explains lower performance of the framework in yellow channel. Also it makes our scheme more suitable for professional, industrial applications where much more control over color management is provided, as opposed to small print centers.

Note that although the proposed color barcodes achieve reasonably high decoding rates (i.e., typically higher than 50% accuracy), in most cases, they cannot achieve the same decoding rate of the monochrome counterpart in all color channels. This however, is not a major problem since in many mobile applications a video sequence of the barcode is captured, where more than one frame can be used to extract the data in individual color channels. In contrast with several other color barcode technologies that encode data in color, the proposed construction of color barcodes is significantly more robust to mis-registration errors. In the proposed construction of the color barcodes, independent data is encoded in print colorant layers and color interference cancellation is used at the decoder to overcome cross-channel coupling. This gives the method inherent registration to mis-registration errors. While the layers may be mis-registered, because the data is independently encoded and decoded from each layer ii is robust against the mis-registration, unlike other methods that rely on the color produced in combination of the overlay of the colorant layers (with changes with mis-registration).

The increased capacity via per channel encoding paves the way for many commercial applications. For example, in advertising embedding of additional tracking data would allow a user to analyze over time number and location of barcode scans. Upon decoding the user would be directed to a particular URL, and at the same time a packet could be sent to a different server tracking the number/location of scans. Current solutions typically direct the user to a tracking server after which the user is redirected to the website of interest. This means increased latency and decreased user experience. Encoding data in independent channels can also be used for data tagging. In a machine readable business card, a person's name can be encoded in one channel, and his position and e-mail or phone number in the remaining two. The decoder could easily organize such information into an address book entry. Finally, increased capacity can be simply used to embed more information in the code for example in geo-tagging, price tagging, tourism, shopping, etc.

What we claim is:

1. A method of decoding a two-dimensional color barcode comprising:

capturing an image of the two-dimensional color barcode having a plurality of layers of encoded data with a three channel image capture device, wherein a first channel is sensitive to the red region of the spectrum, a second channel is sensitive to the blue region of the spectrum, and a third channel is sensitive to the green region of the spectrum, and wherein each layer of said plurality of layers of said two-dimensional color barcode comprises a barcode encoding a plurality of data into a single colorant;

performing color interference cancellation to estimate three cyan, magenta, and yellow colorant layers from the channels that are sensitive to the red, green and blue regions of the spectrum; and extracting the first, second, and third layers of encoded data from the channels that are sensitive to the red, green and blue regions of the spectrum using said estimates of the three cyan, magenta, and yellow colorant layers.

2. The method according to claim 1 wherein performing color interference cancellation includes estimation of parameters for the cancellation using synchronization patterns located in a plurality of regions within the color two-dimensional barcode, wherein said synchronization patterns are comprised of at least two pre-determined colorant combinations.

3. The method according to claim 1 wherein performing color interference cancellation includes estimation of parameters for the cancellation from a region of the color two-dimensional barcode where data is encoded.

4. The method according to claim 3, wherein the estimation of parameters further includes iterating between the estimation of parameters and estimating the data value for each of the data locations in the region of the color two-dimensional barcode where data is encoded data for each of the three cyan, magenta, and yellow colorant layers.

5. A system for decoding a two-dimensional color barcode comprising:

a computer readable storage memory;

a processor for executing computer program instructions stored in the computer readable storage memory, wherein the instructions are for performing the steps of:

capturing in three channels an image of the two-dimensional color barcode having a plurality of layers of encoded data, wherein a first channel is sensitive to the red region of the spectrum, a second channel is sensitive to the blue region of the spectrum, and a third channel is sensitive to the green region of the spectrum, and wherein each layer of said two-dimensional color barcode comprises a barcode having encoded within a plurality of data encoded into a single colorant;

performing color interference cancellation to estimate three cyan, magenta, and yellow colorant layers from the channels that are sensitive to the red, green and blue regions of the spectrum; and extracting the first, second, and third layers of encoded data from the channels that are sensitive to the red, green and blue regions of the spectrum using said estimates of the three cyan, magenta, and yellow colorant layers.

6. The system according to claim 5 wherein performing color interference cancellation further comprises computer program instructions for performing the step of estimating parameters for the cancellation using synchronization patterns located in a plurality of regions within the color two-dimensional barcode, wherein said synchronization patterns are comprised of at least two pre-determined colorant combinations.

7. The system according to claim 5 wherein performing color interference cancellation further comprises computer program instructions for performing the step of estimating of parameters for the cancellation from a region of the color two-dimensional barcode where data is encoded.

8. The system according to claim 7, wherein the estimation of parameters further comprises computer program instructions for performing the step of iterating between the estimation of parameters and estimating the data value for each of the data locations in the region of the color two-dimensional barcode where data is encoded data for each of the three cyan, magenta, and yellow colorant layers.

9. A method of decoding a two-dimensional color barcode comprising:

capturing an image of the two-dimensional color barcode with a image capture device having at least three channels, the two-dimensional color barcode comprising at least a first layer and a second layer, each of said first layer and said second layer comprising data encoded into a barcode, said first layer comprising a first colorant comprising one of three CMY colorants, said second layer comprising a second colorant comprising one of three CMY colorants, said second colorant different from said first colorant, said image capture device comprising a first channel sensitive to a red region of a spectrum, a second channel sensitive to a blue region of said spectrum, and a third channel sensitive to a green region of said spectrum;

performing color interference cancellation to estimate at least two colorant layers of a cyan colorant layer, a magenta colorant layer, and a yellow colorant layer from said channels that are sensitive to the red, green and blue regions of the spectrum; and extracting at least two layers of encoded data from said estimate of said at least two colorant layers.

* * * * *